(12) United States Patent (10) Patent No.: US 7,120,859 B2
Wettach (45) Date of Patent: Oct. 10, 2006

(54) DEVICE FOR PRODUCING MULTIMEDIA PRESENTATION

(75) Inventor: Reto Wettach, Tokyo (JP)

(73) Assignee: Sony Corporation, (JP)

( * ) Notice: Subject to any disclaimer, the term of this patent is extended or adjusted under 35 U.S.C. 154(b) by 365 days.

(21) Appl. No.: 10/238,942

(22) Filed: Sep. 10, 2002

(65) Prior Publication Data

US 2003/0112268 A1 Jun. 19, 2003

(30) Foreign Application Priority Data

Sep. 11, 2001 (JP) ............................. 2001-274818

(51) Int. Cl.
*G06F 15/00* (2006.01)
(52) U.S. Cl. .................................. 715/500.1; 715/723
(58) Field of Classification Search ............. 715/500.1, 715/723, 728, 716
See application file for complete search history.

(56) References Cited

U.S. PATENT DOCUMENTS

| 5,884,028 | A  | * | 3/1999  | Kindell et al. ............... 709/234 |
| 5,946,487 | A  | * | 8/1999  | Dangelo ....................... 717/148 |
| 6,317,141 | B1 | * | 11/2001 | Pavley et al. ................. 715/732 |
| 6,553,178 | B1 | * | 4/2003  | Abecassis ..................... 386/83  |
| 6,559,882 | B1 | * | 5/2003  | Kerchner ...................... 348/61  |
| 6,626,799 | B1 | * | 9/2003  | Watterson et al. ............. 482/4   |
| 6,632,248 | B1 | * | 10/2003 | Isaac et al. ............... 715/501.1 |
| 6,683,649 | B1 | * | 1/2004  | Anderson ............... 348/333.05 |
| 6,709,334 | B1 | * | 3/2004  | Miyagawa et al. ............ 463/31 |
| 6,738,075 | B1 | * | 5/2004  | Torres et al. ................ 715/723 |
| 6,756,533 | B1 | * | 6/2004  | Aoki ............................ 84/609  |
| 6,813,745 | B1 | * | 11/2004 | Duncombe ............... 715/500.1 |
| 7,051,275 | B1 | * | 5/2006  | Gupta et al. ................. 715/512 |
| 2002/0116716 | A1 | * | 8/2002  | Sideman ....................... 725/91  |
| 2002/0138619 | A1 | * | 9/2002  | Ramaley et al. ............ 709/226 |
| 2002/0156800 | A1 | * | 10/2002 | Ong ........................... 707/203 |
| 2002/0160823 | A1 | * | 10/2002 | Watabe et al. .................. 463/7 |
| 2002/0188772 | A1 | * | 12/2002 | Radcliffe et al. ............. 710/38 |
| 2002/0194195 | A1 | * | 12/2002 | Fenton et al. ............. 707/104.1 |
| 2003/0053461 | A1 | * | 3/2003  | Ross .......................... 370/394 |
| 2003/0076757 | A1 | * | 4/2003  | Kanou et al. ............. 369/47.16 |
| 2003/0085913 | A1 | * | 5/2003  | Ahmad et al. .............. 345/730 |
| 2003/0085997 | A1 | * | 5/2003  | Takagi et al. ............... 348/143 |
| 2003/0088877 | A1 | * | 5/2003  | Loveman et al. ............. 725/92 |

(Continued)

OTHER PUBLICATIONS

Ng et al., Optimal Clip Ordering for Multi-clip Queries, the VLDB Journal, 1998, pp. 239-252.*

*Primary Examiner*—Cong-Lac Huynh
(74) *Attorney, Agent, or Firm*—Lerner, David, Littenberg, Krumholz & Mentlik, LLP (57) ABSTRACT

A device for producing a multimedia presentation consisting of content includes a memory, a setting unit, an extraction unit, a requesting unit, a receiving unit, and a combiner. The memory stores first digital media classified by time of creation. The setting unit sets the duration of the presentation and a time period for the content. The extraction unit extracts from the memory portions of the first digital media created during the time period. The requesting unit requests general digital media corresponding to the time period from a general digital media source. The receiving unit receives the general digital media from the general digital media source. The combiner combines the received general digital media with the extracted portions of the first digital media to produce the presentation.

7 Claims, 8 Drawing Sheets

U.S. PATENT DOCUMENTS

2003/0196164 A1* 10/2003 Gupta et al. ............. 715/500.1
2003/0206720 A1* 11/2003 Abecassis ................... 386/83
2004/0205461 A1* 10/2004 Kaufman et al. ........... 715/500
2004/0205478 A1* 10/2004 Lin et al. ................. 715/500.1
2004/0205479 A1* 10/2004 Seaman et al. .......... 715/500.1
2005/0229213 A1* 10/2005 Ellis et al. .................... 725/58

* cited by examiner

```
<!DOCTYPE Request SYSTEM "request.dtd">
<Request>
    <NewsContent type="International new highlights"/>
    <Date start="01.03.00" end="31.08.00"/>
    <Sampling timeUnit="sec" clipLength="10" numberOfClips="5"/>
</Request>
```

FIG.8

```
<!-- Element declarations -->
<!ELEMENT Request (((NewsContent,Date)|(EntertainmentContent,Title)),((Sampling,GeographicalInfo?))>
<!ELEMENT NewsContent EMPTY>
<!ELEMENT EntertainmentContent EMPTY>
<!ELEMENT Date EMPTY>
<!ELEMENT Title EMPTY>
<!ELEMENT Sampling EMPTY>
<!ELEMENT GeographicalInfo EMPTY>
<!-- Attribute declarations -->
<!ATTLIST NewsContent type CDATA #REQUIRED>
<!ATTLIST EntertainmentContent type CDATA #REQUIRED>
<!ATTLIST Date start CDATA #REQUIRED end CDATA #REQUIRED>
<!ATTLIST Title name CDATA #REQUIRED>
<!ATTLIST Sampling timeUnit (sec|min) "sec">
<!ATTLIST Sampling clipLength CDATA #REQUIRED numberOfClips CDATA #REQUIRED>
<!ATTLIST GeographicalInfo coordinates CDATA #REQUIRED>
```

FIG.9

DEVICE FOR PRODUCING MULTIMEDIA PRESENTATION

CROSS REFERENCE TO RELATED APPLICATIONS

The present application claims priority from Japanese Application No. 2001-274818 filed Sep. 11, 2001, the disclosure of which is hereby incorporated by reference herein.

BACKGROUND OF THE INVENTION

The present invention relates to a device for producing a multimedia presentation from stored audio/video data.

There has been known a software application for producing a multimedia presentation from stored audio/video data. When the software is run on a personal computer, the computer displays an icon representing the software. The user uses a mouse to "drag" icons representing audio/video files into the icon of the software. The software then extracts random sections of the data in the audio/video files and combines the sections together into a multi-media presentation.

However, the video clips of the presentation are arranged in a random manner, so the presentation lacks a sense of time. Also, the audio/video files contain only a limited amount of information, mainly of a nature that is personal to the user. Therefore, the resulting presentation has a very narrow scope.

SUMMARY OF THE INVENTION

In order to achieve this objective, a device for producing a multimedia presentation consisting of content includes a memory, a setting unit, an extraction unit, a requesting unit, a receiving unit, and a combiner. The memory stores first digital media classified by time of creation. The setting unit is operable to set a duration of the presentation and a time period for the content. The extraction unit is operable to extract from the memory portions of the first digital media created during the time period. The requesting unit is operable to request general digital media corresponding to the time period from a general digital media source. The receiving unit is operable to receive the general digital media from the general digital media source. The combiner combines the received general digital media with the extracted portions of the first digital media to produce the presentation.

With this configuration, the presentation includes first digital media synchronized with general digital media of the same time period. The presentation is generated fully automatically based on a few settings which can be set by the user.

It is desirable for the first digital media to be classified based on metadata embedded in the first digital media, the metadata including a time stamp indicating when the first digital media was created. Such a time stamp is available for most digitally created contents, so synchronization is convenient.

It is desirable that the metadata include location data embedded in the first digital media indicating where the first digital media was created, and that the extraction unit be operable to extract from the memory first digital media corresponding to the location data. With this configuration, the presentation shows more detail and background about the first digital media.

It is desirable that one of the extracted portions of the first digital media and the received general digital media includes music, and that the combiner combine the extracted portions of the first digital media and the received general digital media in clips of length dependent on a tempo of the music. With this configuration, visual and audio portions of the presentation are harmonized with the same style.

It is desirable that the extraction unit determine the relative distribution of the first digital media in the memory among a plurality of sub-periods of the time period and extract a greater amount of the first digital media for ones of the sub-periods having a greater total amount of the first digital media than others of the sub-periods having a lesser total amount of the first digital media. With this configuration, the presentation will more accurately reflect active periods when more of the first digital media was created, and will have a better balance.

It is desirable that the setting unit set a ratio of the first digital media to the general digital media based on an input from a user. With this configuration, the user can better modify the tone of the presentation.

BRIEF DESCRIPTION OF THE DRAWINGS

The above and other objects, features and advantages of the invention will become more apparent from reading the following description of the embodiment taken in connection with the accompanying drawings in which.

DETAILED DESCRIPTION

Next, a system according to an embodiment of the present invention for producing a multimedia presentation will be described with reference to the attached drawings.

Figure 1:
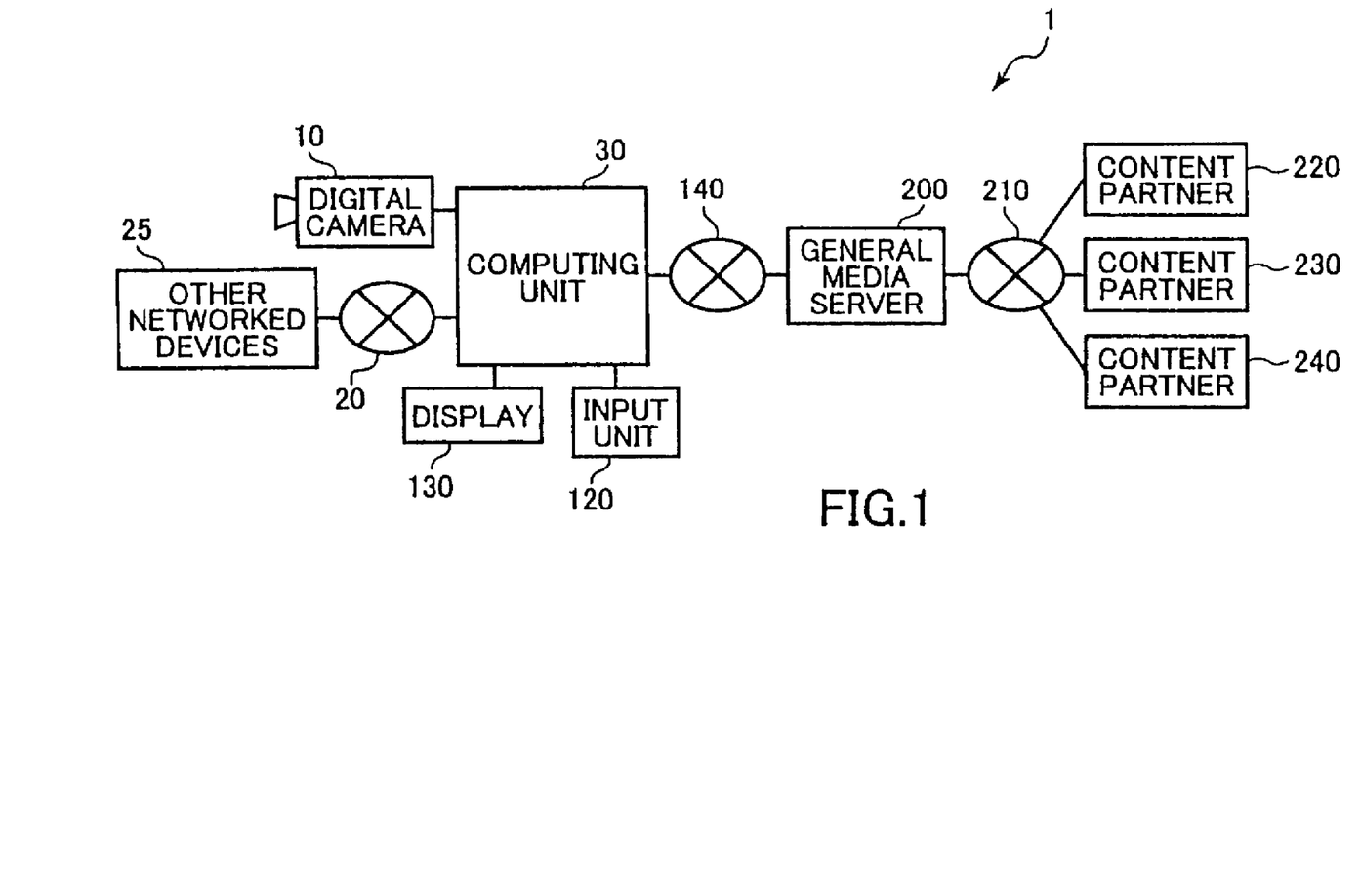
FIG. 1 is a block diagram showing a system according to an embodiment of the present invention.

As shown in FIG. 1, the system 1 according to the embodiment includes a computing unit 30, a general media server 200, and content partners 220, 230, 240. The computing unit 30 is connected to a digital video camera 10, an input unit 120, and a display 130. The computing unit 30 is also connected to other personal networked devices 25 through a home network 20 and to the general media server through a public network 140, such as the Internet. Examples of other personal networked devices 25 include a minidisk recorder/player, a DVD player, a video-on-demand player, and an MP3 player. The general media server 200 is connected to the content partners 220, 230, and 240 through a network 210.

Figure 2:
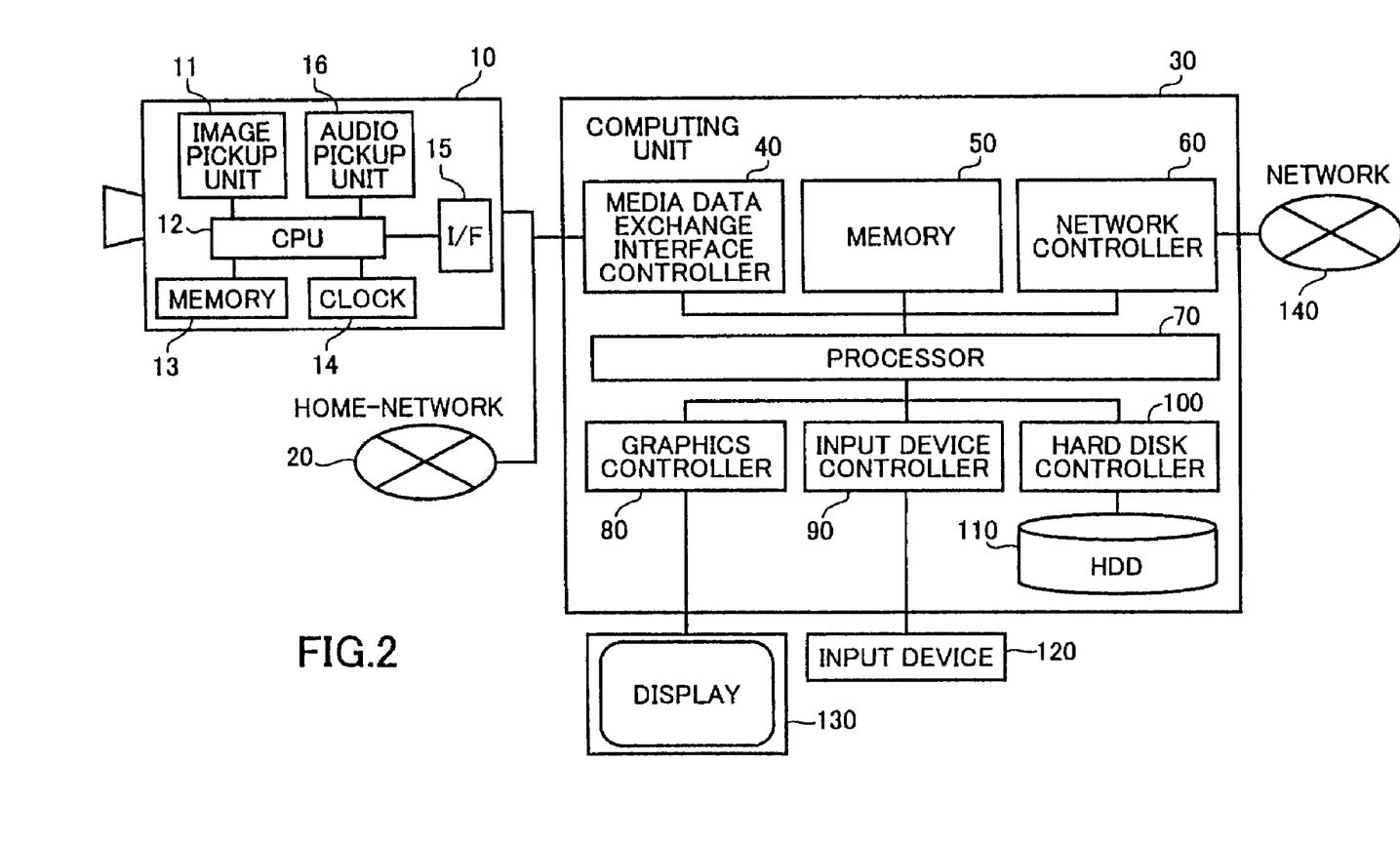
FIG. 2 is a block diagram showing internal components of a computing unit and digital camera of the system of FIG. 1.

As shown in FIG. 2, the digital camera 10 includes an image pick-up unit 11, a central processing unit 12, a memory 13, a clock 14, an interface 15, and an audio pick-up unit 16. The image pick-up unit 11 picks up images and converts them into digital video data using well-known processes. At the same time, the audio pick-up unit 16 picks up sounds and converts them into digital audio data using well-known processes. The digital audio data and the digital video data is multiplexed by a multiplexer (not shown) into what will be referred to collectively hereinafter as personal media. The central processing unit 12 embeds metadata into the personal media data. The metadata includes the time that the personal media data was created based on a clock signal from the clock 14. The central processing unit 12 then stores the personal media data in the memory 13.

The computing unit 30 includes a media data exchange interface controller 40, a memory 50, a network controller 60, a processor 70, a graphics controller 80, an input device controller 90, a hard disk controller 100, and a hard disk 110. The hard disk 110 stores software for retrieving and transmitting various data across the networks 20, 140 and retrieving personal media data from the digital camera 10. The hard disk 110 also stores software for performing a presentation producing routine to be described later with reference to the flowchart of FIG. 4.

The computing unit 30 includes a calendar function and an e-mail function. The calendar function displays a calendar on the display 130. The user can use the input unit 120 to input meeting times, special events, and the like in the days of the displayed calendar. The calendar function also enables the user to highlight special calendar entries using a flag or priority indicator. The e-mail function enables exchange of e-mail messages with other computing devices (not shown) connected to the network 140. The e-mail function also enables the user to highlight special received or sent e-mail messages using a flag or priority indicator.

Figure 3:
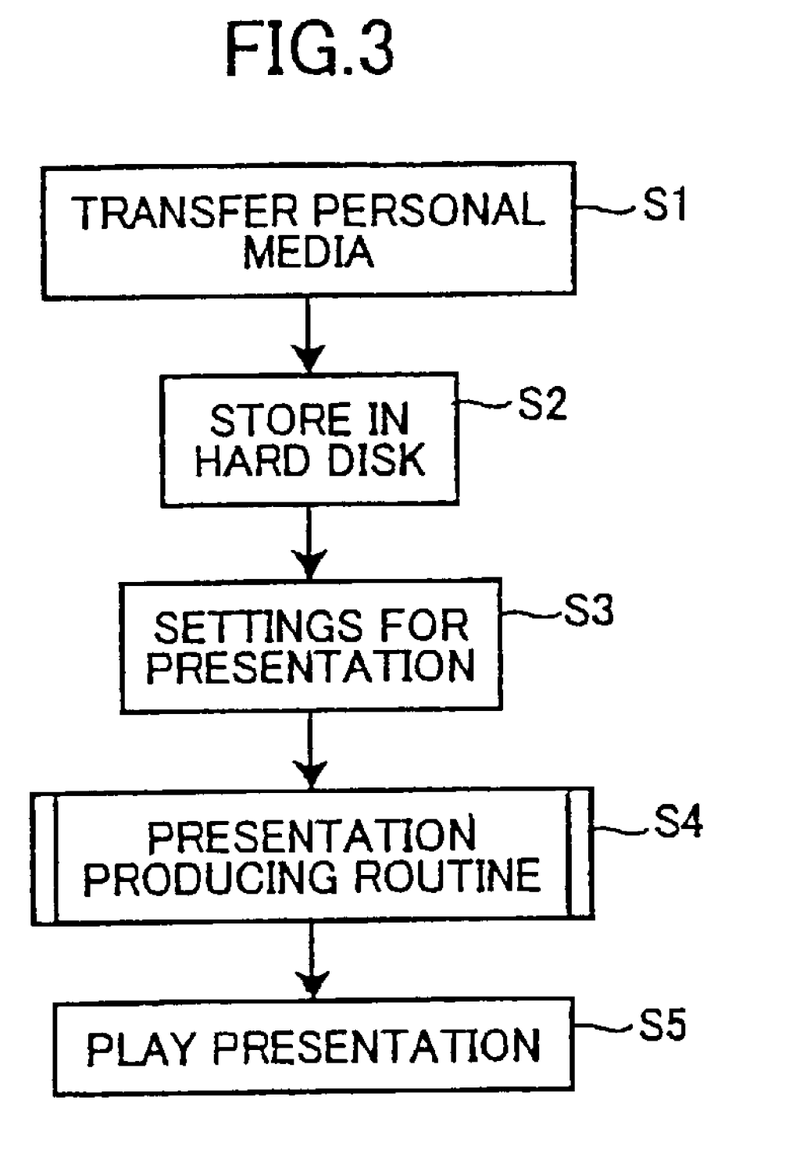
FIG. 3 is a flowchart representing operations performed by the computing unit to produce a multimedia presentation.
Figure 4:
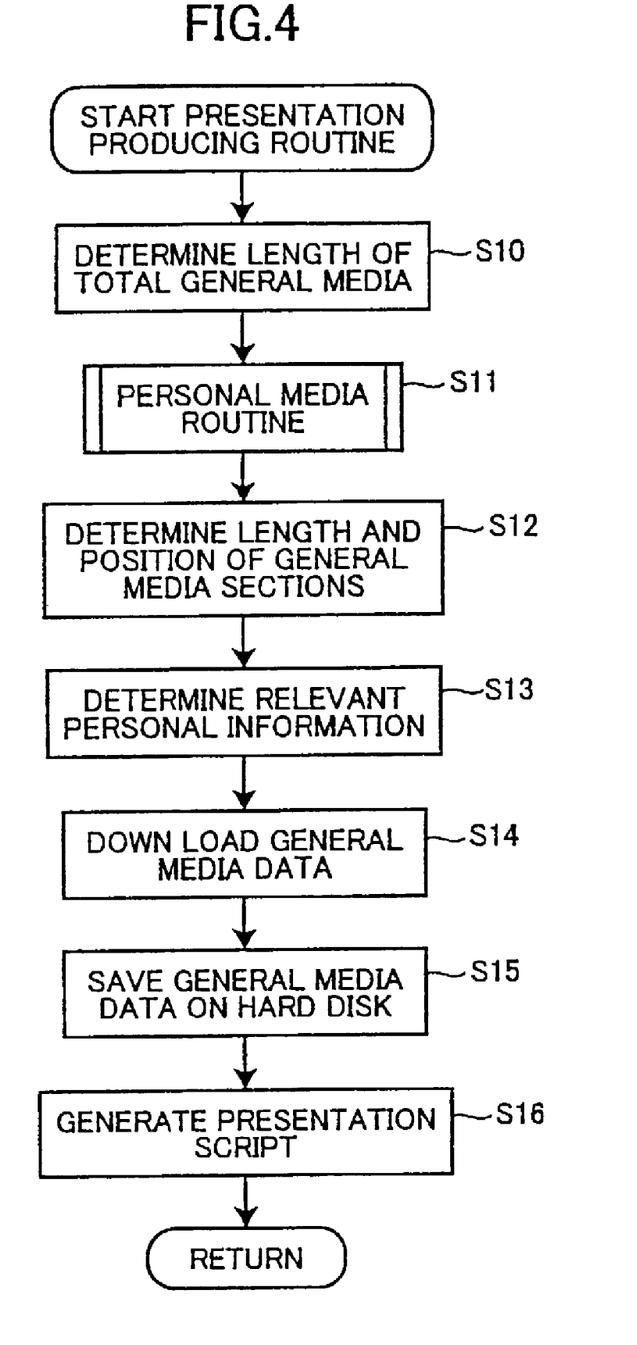
FIG. 4 is a flowchart representing a presentation producing routine performed by the computing unit.
Figure 5:
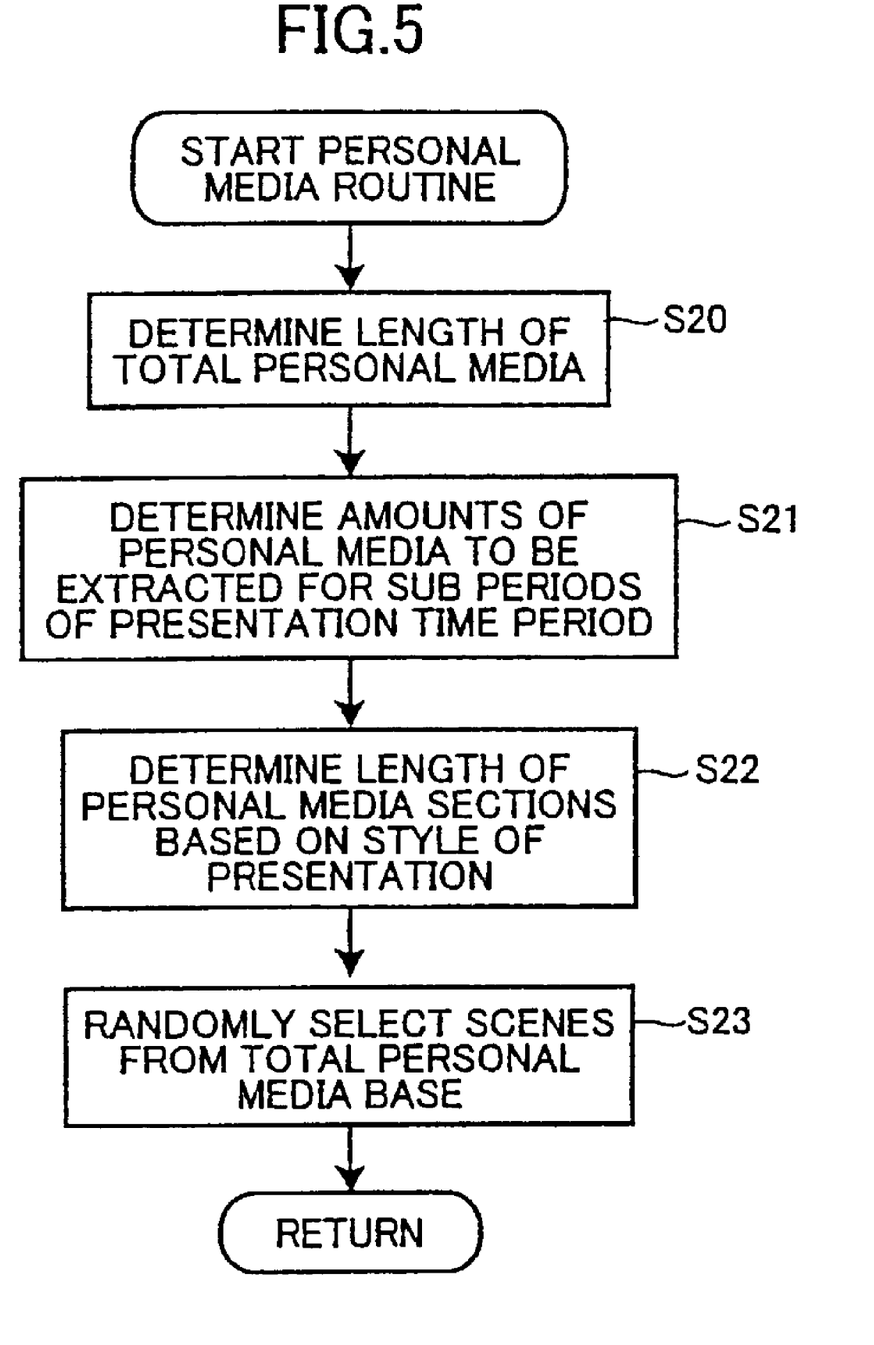
FIG. 5 is a flowchart representing a personal media routine performed by the computing unit.

Here, operations performed by the computing unit 30 to produce a multimedia presentation will be described while referring to the flowcharts in FIGS. 3 to 5. The user uses the input unit 120 to start transfer of the personal digital media, including the embedded metadata, from the memory 13 through operations of the CPU 12, the interface 15, the media data exchange interface controller 40, and the processor 70 (S1). The personal digital media is stored on the hard disk 110 through operations of the processor 70 and the hard disk controller 100 (S2). After the personal media data is stored, it can be edited using functions of the computing unit 30 as desired.

Next, the settings for the multimedia presentation are set based on input from the input unit 120 (S3). The settings include the length of the presentation, the time period, the types of general media data to be included, types of optional personal information, ratio of personal to general media, whether to include or exclude folders, and style of presentation.

The length of the presentation is merely how long the user wishes the presentation to be, for example, one minute, three minutes, 10 minutes, or longer.

The time period is the time frame from which personal and general media data is to be collected. For example, the user can specify a particular day, week, or month, or dates or even times that the time period starts and ends.

Various types of general media can be retrieved from content partners 220, 230, and 240 through cooperation with the general media server 200. Examples of possible general media include weather information, news highlights, local news, scenes from top-ten movies, sections of top-ten popular music, and even popular television commercials.

Optional personal information can be added to the personal media to enhance the personal portion of the presentation. For example, the entries highlighted using the personal calendar function or messages highlighted using the e-mail function of the computing unit 30 can be included in the presentation to show events that were of particular personal importance to the user, which makes the presentation more personalized. Another source of optional personal information is the other networked devices 25 connected to the computing unit 30 through the network 20. For example, a video-on-demand player can provide statistical information about which videos the user views most frequently during the time period. Similarly, an MP3 player can provide statistical information about which songs the user listens to most frequently.

The ratio of personal to general media is a value set by the user to designate how much of the presentation will be personal media and how much will be general media from external sources such as the content partners.

Folders representing information files can be selectively shown in the presentation.

The style of presentation is determined automatically by music selected either as part of the general media or the optional personal information. Basically, the clip length of the video portion of the presentation is dependent on the tempo of the accompanying music. For example, when the general media includes a top-ten pop song with a quick tempo, then the clip length is set relatively short, resulting in a fast-paced presentation. On the other hand, if the optional personal information includes a classical song with a slow tempo, then the clip length is set relatively long, resulting in a more relaxed presentation. If neither the general media nor the optional personal information includes music, then the user must set the style of presentation manually.

Next, a presentation producing routine is performed (S4). During the presentation producing routine, the computing unit 30 organizes private and general media according to the user's settings. The presentation producing routine will be described with reference to the flowchart in FIG. 4.

When the presentation producing routine is started, the length of the total general media is determined (S10). The length of the total general media is the product of the presentation length times the ratio of general media to the sum of the personal media and the general media (that is, length of total general media=presentation length×general media/(personal media+general media)).

Figure 6:
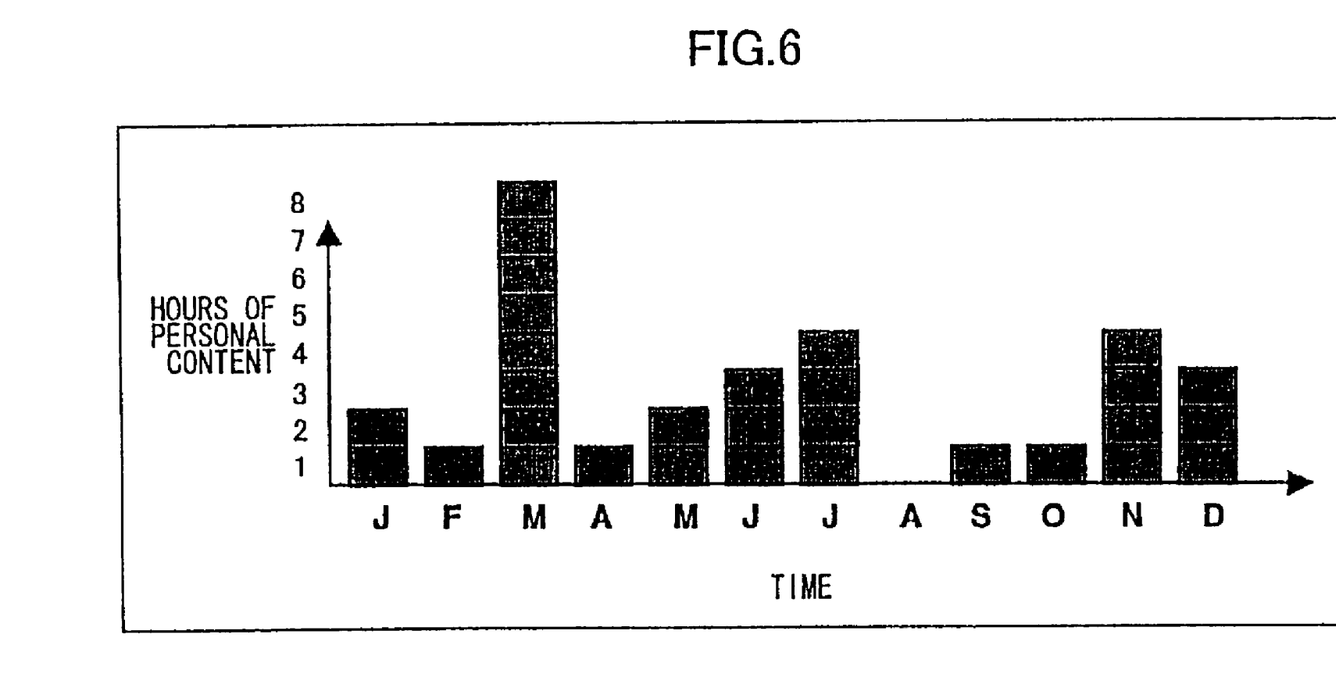
FIG. 6 is a bar graph representing a time-wise distribution of personal media.

Next, a personal media routine is performed (S11). Here, the personal media routine will be described with reference to the flowchart in FIG. 5. First, the total length of the personal media portion of the presentation is determined by subtracting the length of the general media portion from the presentation length (personal media=presentation length−general media) (S20). Then amounts of the personal media to be extracted for each sub-period of the overall presentation time period are determined based on the distribution of personal media over time (S21). FIG. 6 shows an example for distribution of personal media over a one year period from January to December. In the example, there is a total of 30 hours of personal media for the year, with eight hours of it concentrated in March. Therefore, if the time period of the presentation were set to this one year period and the presentation length were set to 15 minutes, then four minutes worth of personal media would be extracted from March content.

Next, the length of personal media sections is determined based on the setting of the presentation style, that is, short length for rapid presentation style and longer length for slower presentation style (S22). Then sections of the personal media data are selected at random (S23).

Next, the length and position of general media sections in the presentation is determined (S12). In the same manner as with personal media, the average length of general media sections for the presentation is based on style of presentation. Also, the frequency of general media sections depends on the time-based distribution of personal media. In the example of FIG. 6, March has eight times more personal media than September or October, so eight times more general media from March will be added to the presentation than from September or October. Also, no general media will be provided for August.

Next, what optional personal information is to be included in the presentation is determined (S13). Most of the information gathered from the e-mail function and the PC calendar function is text, so this information will be animated and laid over the video picture in the pre-defined style of the video. Highlighted e-mail messages that contain an image or some other attachment, and movie clips based on usage statistics, are included as part of the personal media portion of the presentation.

Figure 7:
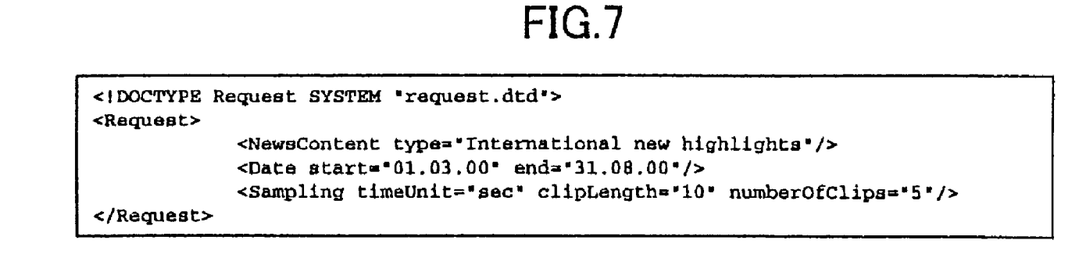
FIG. 7 is a view showing an example of an XML request sent by the computing unit to a general media server.
Figure 8:
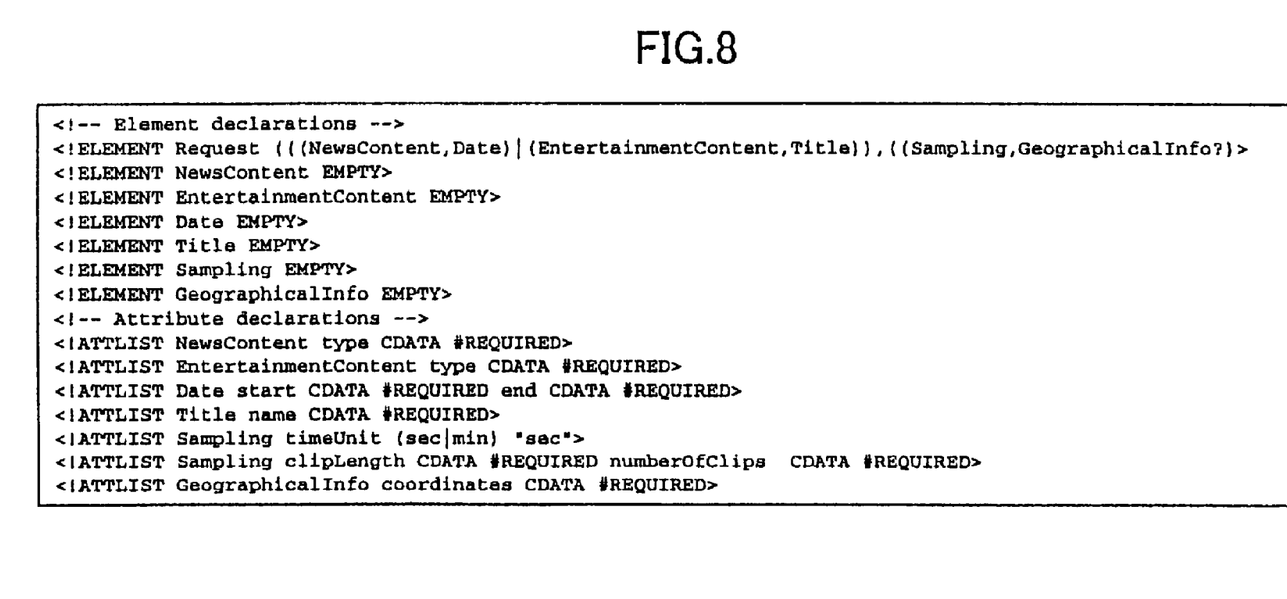
FIG. 8 is a view showing an example of a DTD document defining the XML of FIG. 7.

Then, the general media is downloaded from the general media server 200 (S14). The general media server 200 stores all of the general media provided by the contents partners 220, 230, 240 and updates the data for the general media regularly. When producing a presentation, the computing unit 30 sends a request to the general media server 200 for types of general media set in S3 in amounts determined in S12. For example, if the user designates that world-wide news is the only general media to be included in the presentation, then the computing unit 30 will download the information from the general media server 200 by sending such a request to the general media server 200. The request from the computing unit 30 includes the presentation time period and sub-periods, and flexibility in the length of the general information. An example request sent using extensible markup language (XML) is shown in FIG. 7. The XML is defined by the document type definition (DTD) shown in FIG. 8. The computing unit 30 and the general media server 200 both understand the same DTD and so can communicate using XML messages. A content partner that provides movies or music as general media will allow downloading of authorized highlight scenes or tracks. A special interface is required to enable this kind of downloading.

The downloaded general media is saved on the hard disk 110 (S15). Then, a presentation script is generated by combining the personal media selected in S23 and the general media stored in S15 (S16). The presentation is played in real time as produced (S5).

Figure 9:
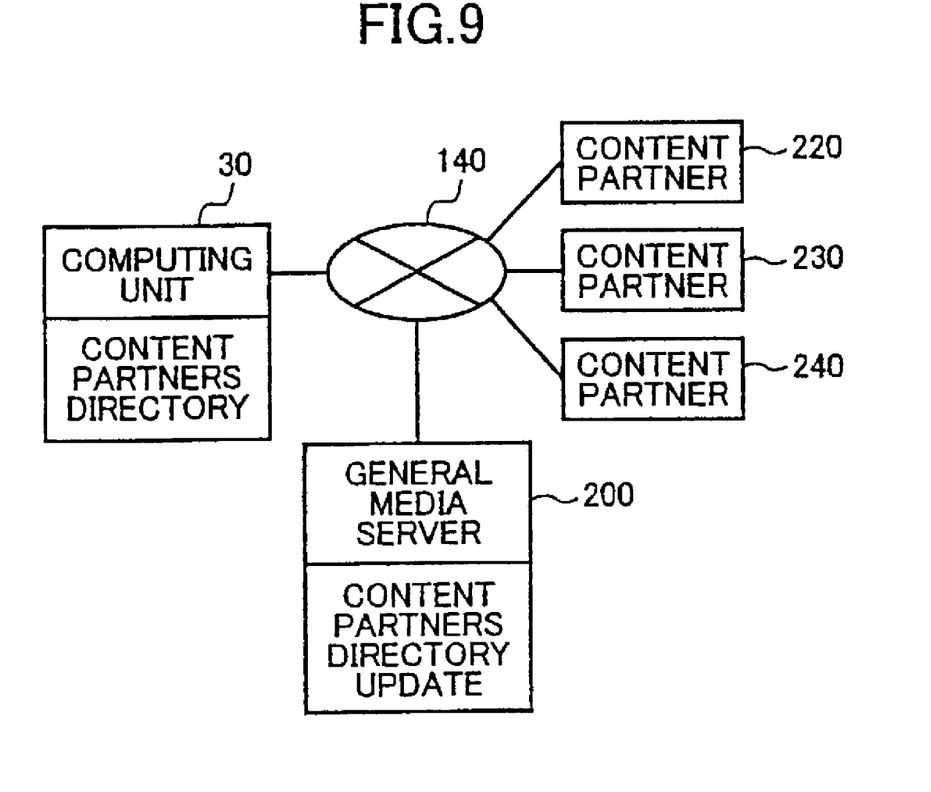
FIG. 9 is a block diagram showing a modification of the embodiment.

FIG. 9 shows a modification of the embodiment. In the modification, the computing unit 30 is connected directly to the content partners 220, 230, 240 through the network 140. The general media server 200 provides the computing unit 30 with a directory including linking information for connecting with the content partners 220, 230, 240 to obtain general media. The general media server 200 provides the computing unit 30 with regular updates of the link directory. With this scenario, the content partners 220, 230, 240 need to establish an interface that is understood by the computing unit 30.

While the invention has been described in detail with reference to specific embodiments thereof, it will be apparent to those skilled in the art that various changes and modifications may be made therein without departing from the spirit of the invention, the scope of which is defined by the attached claims.

For example, the embodiment describes personal digital media being provided by a digital video camera 10. However, the digital media could be provided from any source, such as the computing unit 30 itself.

Also, the embodiment describes various sources of usage statistics, such as an MP3 player and a video-on-demand player, as being external to and networked to the computing unit 30. However, the computing unit 30 itself can serve as a source of user statistics. For example, the computing unit 30 can be provided with an MP3 player function and a video-on-demand function that communicate with the presentation producing module to provide user statistics.

The ratio of personal to general media is described as a value that can be freely set by the user. However, the ratio can be a fixed value. This would be beneficial when the computing unit 30 is an interactive television, which emphasizes convenience to the user over flexibility. Further, the ratio could be dependent on the number of sources of general information for the presentation, which is a number decided by the user. For example, if the user selects weather-details, international news, movie highlights, and sport-highlights for soccer, baseball and tennis, then the ratio of personal to general media will be set to a lower value than if the user only selects weather. That is, the percentage of general information will be higher in the former case than in the latter case.

Although in the embodiment, the time-wise distribution of personal media is based on month-long sub-periods, the sub-periods could be any length, such as a day or even hours, and the length of the sub-periods could vary depending on the scope of the presentation time period. Also, although the clips of personal media are selected randomly in the embodiment, high level content analysis tools could be provided to make selection more specific.

The digital camera 10 can be provided with a global positioning system (GPS) and incorporate a position stamp into the personal media in addition to the time stamp. In this case, based on the position stamp in the personal media, the request from the computing unit 30 can include a request for news, weather reports, and the like from the area where the personal media was originally created.

Instead of playing the presentation as it is produced, the presentation could be stored in memory for use at a later time.

The invention claimed is:
1. A device for producing a multimedia presentation consisting of content, comprising:
   a memory storing first digital media classified by time of creation;
   a setting unit operable to set a duration of the presentation and a time period for the content;
   an extraction unit operable to extract from the memory a number of portions of the first digital media created during the time period;
   a requesting unit operable to request from a general digital media source general digital media from the same time period as that in which the extracted portions of the first digital media were created, and:
      wherein the first digital media includes personal media of a user and metadata of timestamp indicating when the first digital media was created, wherein the general digital media is one or more of weather information, news highlights, local news, scenes from movies and/or television commercials, and wherein the amounts of personal media to be extracted for each sub-period of an overall presentation time period are determined based on a distribution of personal media over time;

a receiving unit operable to receive the general digital media from the general digital media source; and a combiner operable to combine the received general digital media with the extracted number of portions of the first digital media to produce the presentation and to cause the presentation to be stored, wherein at least part of the extracted number of portions of the first digital media and/or the received general digital media is representative of a number of images, one of the extracted number of portions of the first digital media or the received general digital media includes music, and the combiner is further operable to produce the presentation such that timing between adjacent images is dependent upon a tempo of the music.

2. The device as claimed in claim 1, wherein the first digital media is classified based on metadata embedded in the first digital media, the metadata including a time stamp indicating when the first digital media was created.

3. The device as claimed in claim 2, wherein the metadata includes location data indicating where the first digital media was created, and the extraction unit is operable to extract from the memory first digital media corresponding to the location data.

4. The device as claimed in claim 1, wherein the combiner combines the extracted portions of the first digital media and the received general digital media in clips of length dependent on the tempo of the music.

5. The device as claimed in claim 1, wherein the extraction unit determines the relative distribution of the first digital media in the memory among a plurality of sub-periods of the time period and extracts a greater amount of the first digital media for ones of the sub-periods having a greater total amount of the first digital media than others of the sub-periods having a lesser total amount of the first digital media.

6. The device as claimed in claim 1, wherein the setting unit sets a ratio of the first digital media to the general digital media based on an input from a user.

7. The device as claimed in claim 1, wherein the combiner is further operable to cause the presentation to be played on a display device in real time before being stored.

* * * * *